United States Patent
Arling et al.

(10) Patent No.: US 7,243,572 B1
(45) Date of Patent: Jul. 17, 2007

(54) TRANSPORTER SHAFT COUPLING AND UNCOUPLING

(75) Inventors: R. William Arling, Windham, NH (US); W. Patrick Kelly, Goffstown, NH (US); Kevin Webber, Deerfield, NH (US); Andrew Steiner, Manchester, NH (US); Michael J. Slate, Merrimack, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 585 days.

(21) Appl. No.: 10/726,782

(22) Filed: Dec. 3, 2003

Related U.S. Application Data

(60) Provisional application No. 60/430,432, filed on Dec. 3, 2002.

(51) Int. Cl.
*B62D 1/185* (2006.01)
(52) U.S. Cl. .......................................... 74/493; 464/162
(58) Field of Classification Search .................. 74/492, 74/493; 464/30, 32, 160, 162
See application file for complete search history.

(56) References Cited

U.S. PATENT DOCUMENTS

| | | | | |
|---|---|---|---|---|
| 3,604,285 A | * | 9/1971 | Olsson | ........................ 74/492 |
| 4,667,530 A | * | 5/1987 | Mettler et al. | ................. 74/493 |
| 5,243,874 A | * | 9/1993 | Wolfe et al. | ................... 74/493 |
| 6,302,230 B1 | | 10/2001 | Kamen et al. | .............. 180/171 |
| 6,581,714 B1 | | 6/2003 | Kamen et al. | .............. 180/333 |

OTHER PUBLICATIONS

U.S. Appl. No. 10/308,888, filed Dec. 3, 2003, Kamen et al.

\* cited by examiner

*Primary Examiner*—William C Joyce
(74) *Attorney, Agent, or Firm*—Bromberg & Sunstein LLP

(57) ABSTRACT

Apparatus and methods for transporter shaft coupling and decoupling to assure alignment of a user interface with a control shaft through matching asymmetric cylindrical surfaces and alignment of an upper shaft segment and a lower shaft segment with ribs meshing with grooves on rings attached to the upper shaft. A tone confirms proper connection. Alignment apparatus is protected from damage associated with torques applied to the control shaft by tab features designed to first give way before other damage is incurred and from moisture by apparatus that seals the connection between upper and lower shaft segments. The user is protected from sudden loss of control by requiring the user interface to execute a sequence of linear and rotational manipulations during assembly of the shaft.

5 Claims, 6 Drawing Sheets

TRANSPORTER SHAFT COUPLING AND UNCOUPLING

The present application claims priority from U.S. provisional application 60/430,432, filed Dec. 3, 2002, hereby incorporated by reference.

TECHNICAL FIELD

The present invention relates to a control shaft for a device to transport a payload, and, more particularly, apparatus that allows assembly of the control shaft with a user interface and with a platform.

BACKGROUND ART

There are situations where equipment assembled from a number of parts in a particular configuration must be disassembled for storage or transport or readjusted for the benefit of different users or as the result of use. For equipment used for transportation such as bicycles and wheelchairs, in addition to concern for the comfort and convenience of the user, there is additional concern for the user's safety. Thus, there is incentive to have assembly be directed towards the correct orientation and to alert the user if the situation is otherwise.

It is known in the prior art to adjust the position of a bicycle rider relative to the bicycle by adjustment of the height of the seat and the height of the handlebars above the bicycle frame. The seat is attached to a seat post that fits into a first vertical bicycle frame tube. Rotation of a seat bolt attached to the frame tightens around the seat post and holds the seat in a desired orientation relative to the front of the bicycle and at a desired height above the frame. The handlebar is attached to a bifurcated handlebar post that fits into a second vertical bicycle frame tube. A handlebar bolt passing through the center of the handlebar engages the bifurcated handlebar post. As the handlebar bolt is rotated, the sections of the bifurcated seat post separate and engage the inner surface of the second vertical bicycle frame tube, holding the handlebar at the desired height and in the desired orientation.

Readjustment, made necessary either deliberately or through use may be problematic. When another user wishes to use the bicycle, the heights of the seat and handlebar above the frame must often be adjusted. Height adjustment must be done in such a way as not to affect the orientation of the seat and of the handlebar. However, height cannot be adjusted without affecting orientation. Consequently, a bicycle user must employ an iterative process to first adjust the height, then the orientation, then the height again, etc.

Continued safe operation is of essential concern in a transporter that, unlike a bicycle, lacks fore/aft stability. However, firm attachment of a seat or handlebar to a frame by a single frangible coupling component, as by means of a pin, is undesirable since the coupling component is prone to damage, thereby also endangering components of the transporter.

SUMMARY OF THE INVENTION

In accordance with one aspect of the invention, a control shaft for coupling a user interface having a post lacking cylindrical symmetry to a platform that supports a standing user is provided. The control shaft has an upper shaft segment having a bore lacking cylindrical symmetry for receiving the cylindrically asymmetric post of the user interface and a stem fastener for causing attachment of the post to the upper shaft segment.

In certain embodiments, the inner surface of the upper shaft segment and an outer surface of the post have a plurality of lobes. In some embodiments, the post has three lobes. In other embodiments, a cross-sectional profile of the inner surface of the upper shaft segment is similar to a cross-sectional profile of the outer surface of the post. In further embodiments, a cross-sectional profile of each lobe of the inner surface of the upper shaft segment has a radius of curvature greater than the radius of curvature of a cross-sectional profile of an outer surface of the upper shaft segment.

In other embodiments, a control shaft contains a lower shaft segment with at least one rib on an interior surface that extends parallel to an axis of the lower shaft segment and an upper shaft segment with first and second apertures, a first ring attached to an exterior surface of the upper shaft segment and having at least one groove that meshes with the rib and a first tab that fits within the first aperture, and a second ring attached to the exterior surface of the upper shaft segment and having at least one groove that meshes with the rib and a second tab that fits within the second aperture.

In some embodiments, a circumferential width of the first aperture is greater than a circumferential width of the second aperture. The first aperture may be closer to the user interface than the second aperture, and, in addition, the width of the first aperture unfilled by the first tab may be greater than a width of the second aperture unfilled by the second tab. Also, the first and the second ring may be made of plastic.

In illustrative embodiments, a control shaft/user interface assembly has a control shaft with an upper shaft segment and a pin projecting from an interior surface of the upper shaft segment that meshes with a non-rectilinear groove in an outer surface of an asymmetric cylindrical post of the user interface. The groove may comprise a first portion parallel to an axis of the upper shaft segment, a second portion perpendicular to the upper shaft segment axis, and a third portion parallel to the upper shaft support axis.

In further embodiments, a control shaft has a lower shaft segment, an upper shaft segment partially fitting within the lower shaft segment, a lower shaft segment, a ferrule fixedly attached to the lower shaft segment and containing a plurality of wedges, a nut fitting over the upper shaft segment and reversibly attached to the ferrule, and a sealant disposed between the ferrule and the nut or between the ferrule and the upper shaft segment.

In accordance with an aspect of the invention, a control shaft contains a coiled cord that passes through the control shaft between a platform and a user interface. The coiled cord may contain a plurality of electrical cords.

In accordance with another aspect of the invention, a method for protecting a control shaft that has a first and second ring provides that after the first ring breaks upon application of excessive torque to the control shaft, relative rotation between an upper control shaft segment and a lower control shaft segment is limited by the second ring.

In accordance with still another aspect of the invention, a method for protecting a standing user of a personal transporter provides delivery of an audio tone confirming attachment of a control shaft/user interface assembly to the platform.

In still further embodiments, a method is provided for attaching a control shaft for a personal transporter, having an asymmetric cylindrical inner bore and a projecting pin, to a user interface having a grooved asymmetric cylindrical post and a rotatable stem. As the pin engages the groove in the post, the control shaft and the user interface are moved towards each other, rotated relative to each other, and moved towards each other once again. Then, the stem is rotated to engage the post with the control shaft.

In additional embodiments, a method is provided for adjusting the height of a control shaft having an upper and a lower shaft segment and used for coupling a user interface to a platform that supports a standing user of a personal transporter. After the upper shaft segment is positioned partially within the lower shaft segment and a nut passed over an upper shaft segment of the control shaft, the nut is rotated about a ferrule with wedges that is attached to a lower shaft segment of the control shaft. The wedges, which may have elastomeric material permanently affixed to the inside surfaces, are compressed against an outer surface of the upper shaft segment to provide resistance to upper shaft motion and water ingress.

BRIEF DESCRIPTION OF THE DRAWINGS

The foregoing features of the invention will be more readily understood by reference to the following detailed description, taken with reference to the accompanying drawings, in which:

FIG. 2b illustrates arcuate lobes of the outer surface of a post coupled to the user interface, while

DETAILED DESCRIPTION OF SPECIFIC EMBODIMENTS

The present invention is of particular advantage as employed on a personal transporter of the type described in U.S. Pat. No. 6,581,714, incorporated herein by reference. In illustrative embodiments of the invention, a control shaft provides support to a user of a personal transporter and access to its controls. The control shaft, in accordance with embodiments of the present invention, can be adjusted to accommodate users of various heights and be removed to permit convenient storage of the transporter. Adjustment and reassembly are made easier by incorporation of features for preserving orientations of parts attached to the control shaft, in a manner preserved upon reassembly or replacement of parts. The user may be alerted by audio or tactile signals of proper assembly or the necessity for repair.

Figure 1:
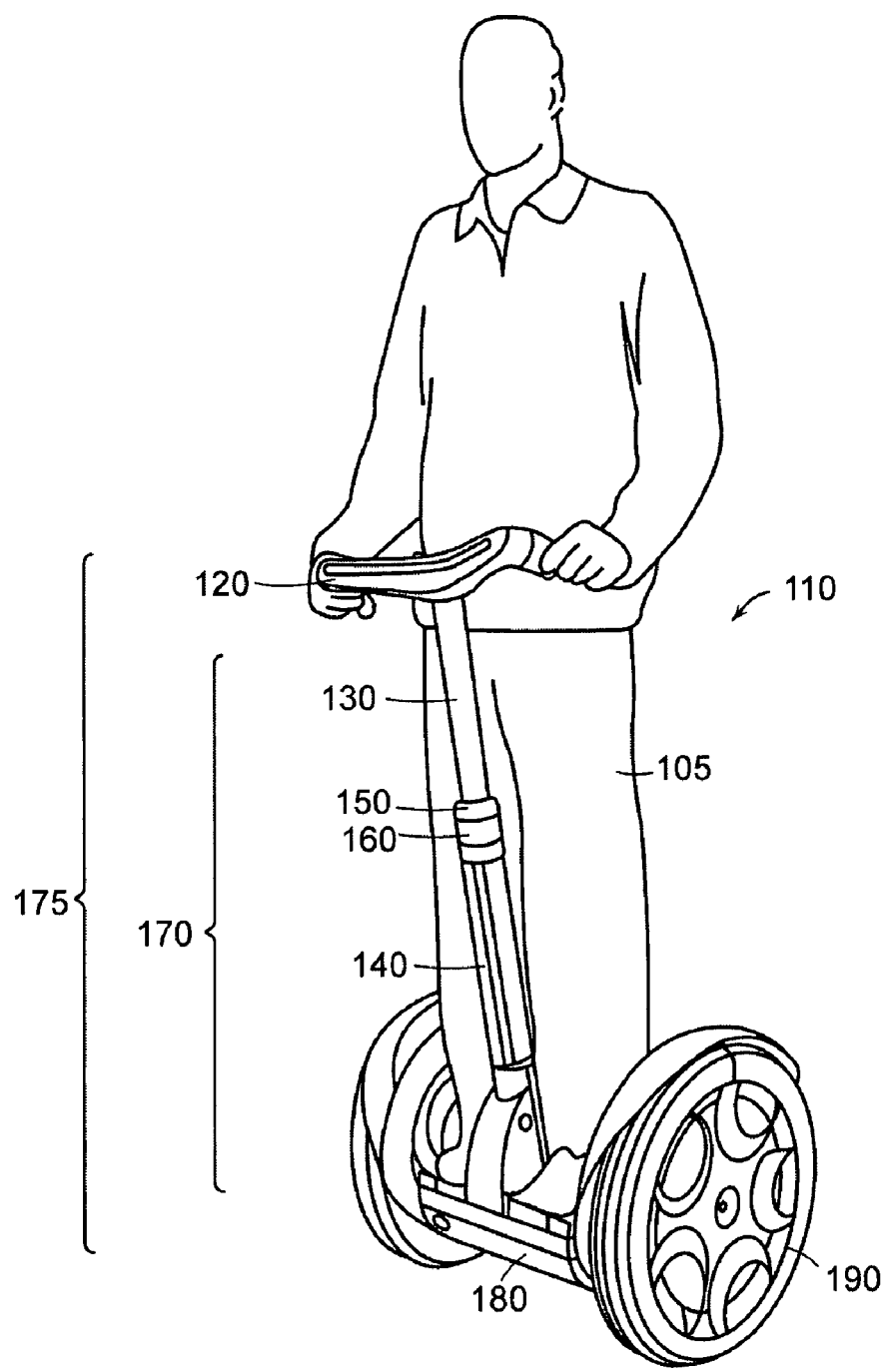
FIG. 1 is an illustration of an embodiment of a personal transporter to which the present invention may advantageously be applied.

FIG. 1 is an illustration of a personal transporter 110, like one described fully in U.S. Pat. No. 6,302,230, issued Oct. 16, 2001, and incorporated herein by reference. Platform 180 is suspended above a surface by surface-contacting elements 190. Control shaft 170, comprising upper shaft segment 130 and lower shaft segment 140 attached, such as by nut 150 and ferrule 160, connects platform 180 to user interface 120. User interface 120 includes an audio transducer 125 (not shown) that may be used to confirm proper assembly of the control shaft as discussed below. In operation, a user 105 stands on platform 180 and might hold on to user interface 120. Control shaft 170 and user interface 120 may, together, be referred to as a control shaft/user interface assembly 175.

Figure 2A:
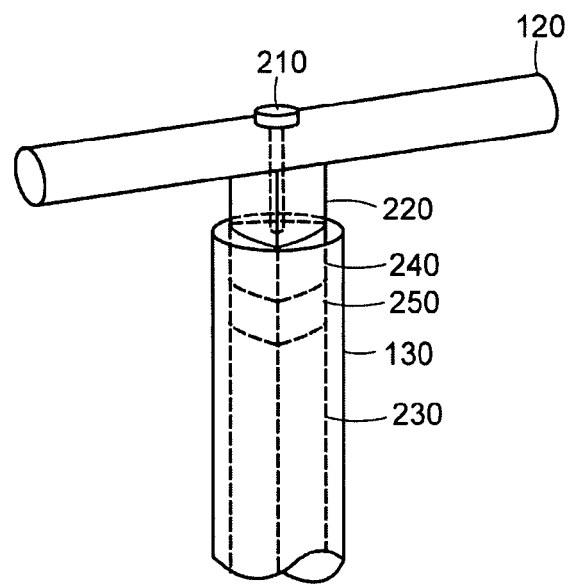
FIG. 2a illustrates an embodiment of the present invention that involves attachment of a user interface to a control shaft by mating of asymmetric cylindrical surfaces.

FIG. 2a illustrates an embodiment permitting connection of user interface 120 to upper shaft segment 130. Since it is desirable that the user 105 of the personal transporter 110 grip the user interface 120 and face in a direction perpendicular to the common axis of wheels 190, user interface 120 and upper control shaft segment 130 should be capable of convenient assembly in proper orientation.

Figure 2C:
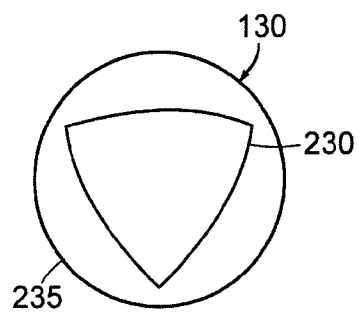
FIG. 2c illustrates a cross-sectional view of an asymmetric cylindrical interior surface of an upper shaft segment, in accordance with an embodiment of the present invention.
Figure 2B:
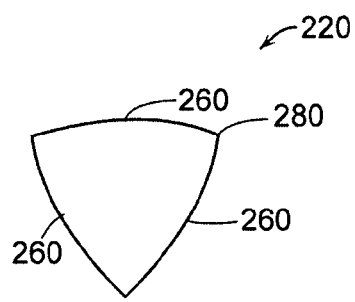

However, often, personal transporter 110 must be disassembled such that, for example, platform 180 and surface-contacting elements 190, user interface 120, and control shaft 170 can be separately loaded into a vehicle. To quickly and reliably assemble user interface 120 to upper shaft segment 130, user interface 120 is connected to a post lacking cylindrical symmetry 220 composed of segments 240 and 250. The cross-sectional profile of outer surface 280 of post 220 can correspond to three lobes 260 where each lobe 260 is a circular arc, as shown in FIG. 2b. Inner surface 230 of upper shaft segment 130 has a similar cross-sectional profile, as illustrated in FIG. 2c. Once post 220 is inserted into upper shaft segment 130, stem fastener 210, sometimes referred to herein as bolt, is rotated. As a result, post segment 240 and 250 are pressed against inner surface 230 and user interface 120 is held in the desired orientation.

Figure 3:
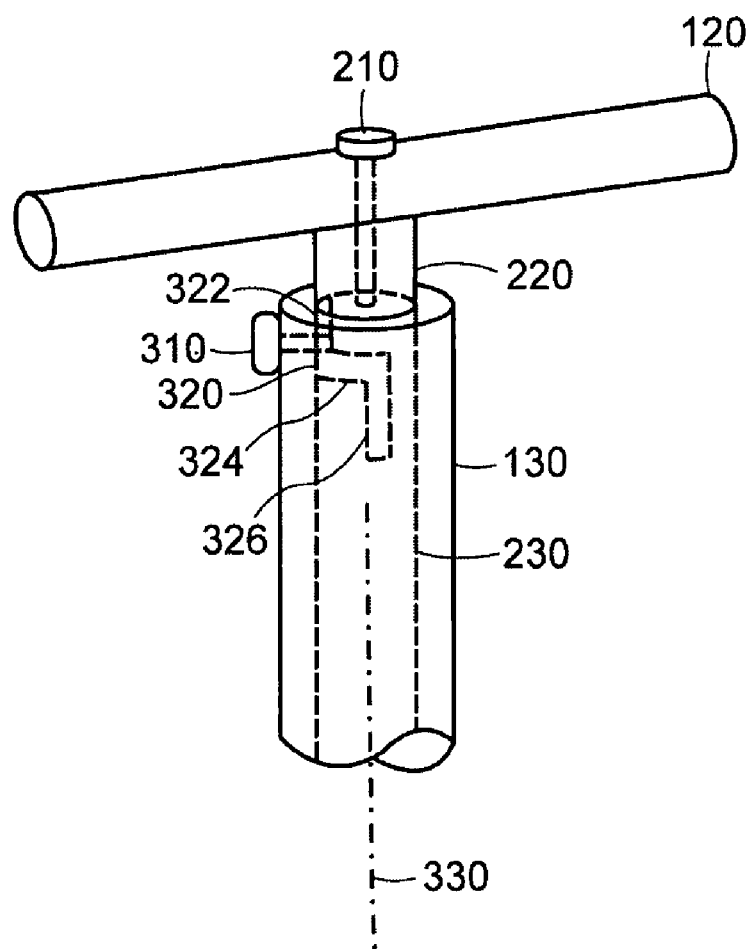
FIG. 3 shows an embodiment of the present invention in which a control shaft pin in employed with user interface groove structures for attaching a user interface to a control shaft.

FIG. 3 illustrates an embodiment that protects user 105 and alerts the user 105 to failure of the connection of bolt 210 to post 220. If bolt 210 or its connection to post 220 fails, the user is endangered by a sudden loss of support. In FIG. 3, upper shaft segment 130 contains a pin 310 that penetrates through the inner surface 230 of upper shaft segment 130. Post 220 contains a groove 320 of depth and width adequate to fit the end of pin 310. Groove 320 has a top groove segment 322 that runs parallel to upper shaft segment axis 330. Top groove segment 322 connects to a middle groove segment 324 that runs perpendicular to axis 330. Middle groove segment 324 connects to bottom groove segment 326 that runs parallel to axis 330.

In attaching user interface 120 and coupled post 220 to upper shaft segment 130, user interface 120, oriented such that pin 310 engages bottom groove segment 322, is initially pushed along axis 330 until pin 310 reaches the top of bottom groove segment 322. At that point, user interface 120 is rotated about axis 330 as pin 310 engages middle groove segment 324. Finally, when pin 310 reaches the end of middle groove segment 324, user interface is again pushed along axis 330.

At this stage, user interface 120 is in the proper orientation and bolt 210 is rotated to fix post 220 against inner surface 230. In the event of a loosening of bolt 210, user interface 120 will remain attached to upper shaft segment 130. In fact, a slight motion allowed to user interface 120 about axis 330 in the event of loss of bolt connection alerts the user to the necessity of equipment inspection.

Figure 4:
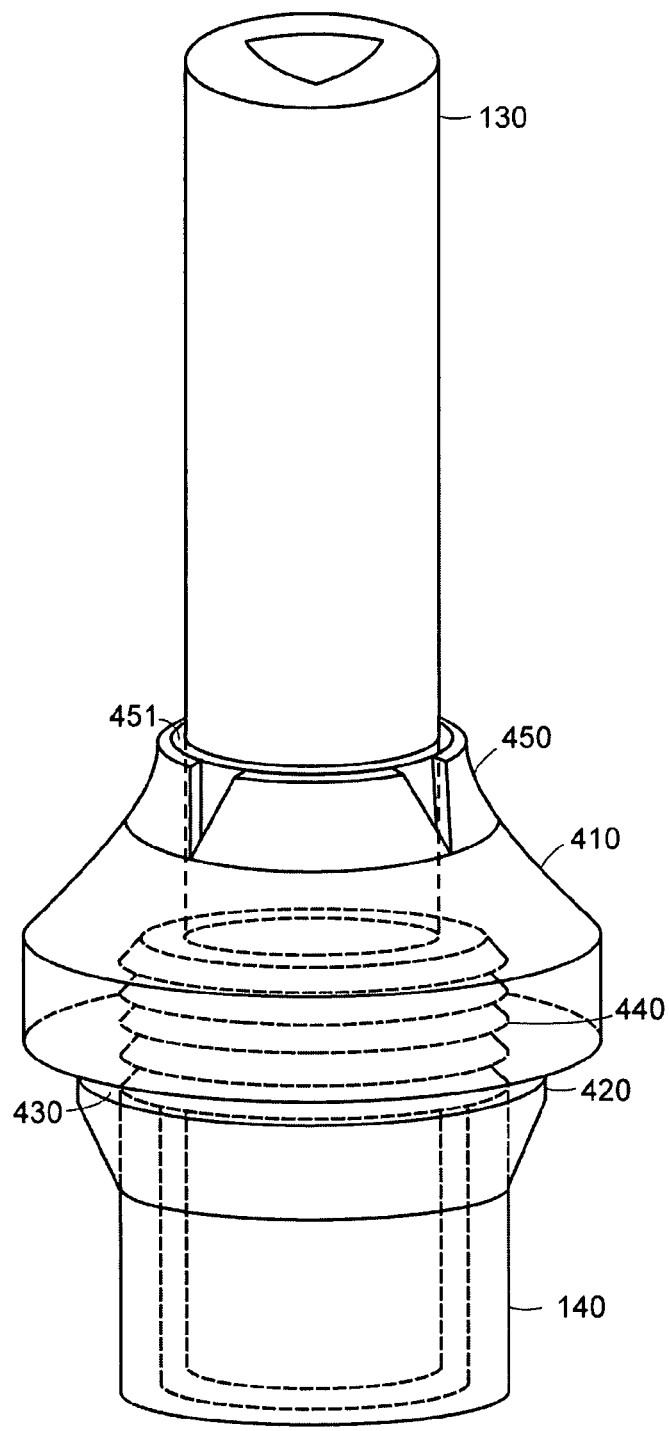
FIG. 4 shows coupling between lower and upper shaft segments that permits variation of shaft height in accordance with an embodiment of the present invention.

FIG. 4 shows an embodiment where upper shaft segment 130 is reversibly connected to lower shaft segment 140. As different people use personal transporter 110, the height of the user interface 120 above platform 180 must be altered to accommodate the various heights of the users. A ferrule 420 is attached to a top end of lower shaft segment 140. Upper shaft segment 130 is slipped first through nut 410 and then into lower shaft segment 140 until user interface 120 (not shown) attached to upper shaft segment 130 is at the proper height. At this point, nut 410 is rotated so as to engage threads 440 of ferrule 420. As a result, wedges 450 on ferrule 420 are pressed against upper shaft segment 130 and hold upper shaft segment 130 in position. As nut 410 is rotated with respect to ferrule 420, sealant 430 may be squeezed between nut 410 and ferrule 420 (or sealant 451 may be squeezed between the ferrule 420 and the upper shaft segment 130) and prevents accumulation of moisture within control shaft 170. The sealant 451 may be an elastomeric material permanently affixed to the inside surfaces of the ferrule wedges 450.

Figure 5:
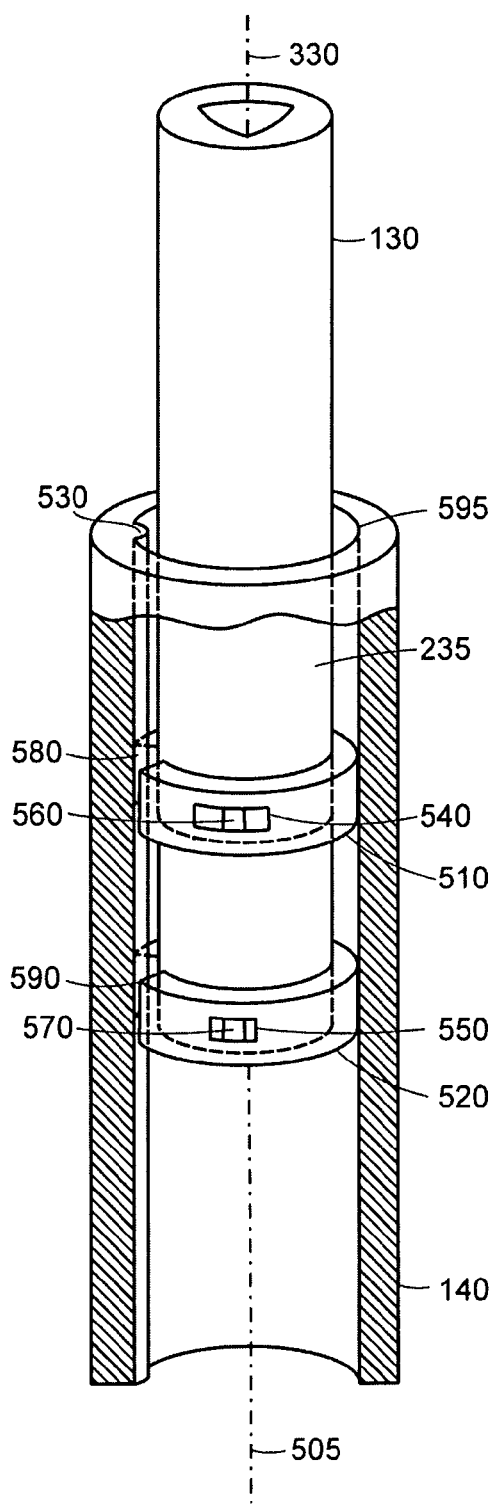
FIG. 5 shows a control shaft rib and ring structures for restricting relative rotation of upper and lower shaft segments in accordance with an embodiment of the present invention.

FIG. 5 shows an embodiment that retains rotational alignment between upper shaft segment 130 and lower shaft segment 140. It is desirable to maintain rotational alignment between upper shaft segment 130 and lower shaft segment 140. If rotational alignment is preserved, orientation of user interface 120 can be preserved as the height of the user interface above the platform is changed. However, if upper shaft segment 130 is subjected to a sudden and powerful torque, inflexible means of maintaining orientation can result in permanent damage to the control shaft.

In FIG. 5, first ring 510 and second ring 520 are attached to outer surface 235 of upper shaft segment 130. First tab 560 attached to first ring 510 fits within first aperture 540. Second tab 570 attached to second ring 520 fits within second aperture 550. The width of first aperture 540 unfilled by first tab 560 is greater than the width of second aperture 550 unfilled by second tab 570. First ring 510 and second ring 520 have first and second ring grooves, 580 and 590 respectively, cut into them. Ring grooves 580 and 590 mesh with rib 530 that extends from inside surface 595 of lower shaft segment 140 along axis 505 of lower shaft segment 140. First ring 510 and second ring 520 are made of a material weaker than the material constituting upper shaft segment 130.

When excessive torque is applied to upper shaft segment 130 through the user interface 120 tending to rotate it about upper shaft segment axis 330, second tab 570 is broken off. As a result, rib 530 is not harmed. Upper shaft 130 remains connected to lower shaft 140 by first ring 510. The rotation sufficient to break second tab 570 does not harm first tab 560 because of the greater space afforded by first aperture 540. As a result, there is a loose connection between upper shaft 130 and lower shaft 140 that alerts the user to the necessity of repair of the control shaft 170.

Figure 6:
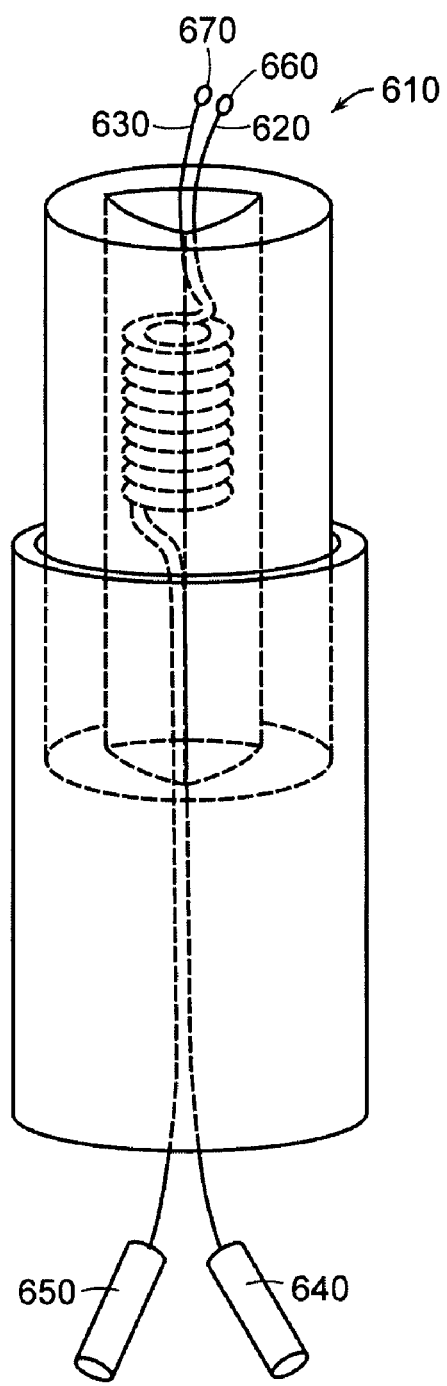
FIG. 6 illustrates a coiled cord for permitting extension and contraction of a control shaft in accordance with embodiments of the present invention.

FIG. 6 shows an embodiment of control shaft 170 that contains coiled cord 610. In order for control shaft 170 to extend and contract so as to accommodate users of different heights, so also must electrical connections between platform 180 and user interface 120. Coiled cord 610 permits extension and contraction of first connection 620 and second connection 630 where separation between first and second user interface terminals (660 and 670 respectively) and first and second platform terminals (640 and 650 respectively) can be varied.

In the course of disconnecting control shaft/user interface 175 from platform 180 to permit storage in a vehicle, for example, first platform terminal 640 and second platform terminal 650 must be disconnected. Upon reassembly of control shaft/user interface 175 to platform 180, first platform terminal 640 and second platform terminal 650 must be reconnected. To alert the user that the electrical connections are complete and functional, a confirmation tone is delivered to the user from speaker 125 (not shown).

Having thus described various illustrative embodiments of the present invention, some of its advantages and optional features, it will be apparent that such embodiments are presented by way of example only and are not by way of limitation. Those skilled in the art could readily devise alternations and improvements on these embodiments, as well as additional embodiments, without departing from the spirit and scope of the invention. All such modifications are within the scope of the invention as claimed.

What is claimed is:

1. A control shaft for coupling a user interface to a platform that supports a standing user of a personal transporter, the control shaft comprising:
   a. a lower shaft segment having at least one rib on an interior surface that extend parallel to an axis of the lower shaft segment and having an exterior surface;
   b. an upper shaft segment, with first and second apertures, coupled to the lower shaft segment;
   c. a first ring, circumferentially coupled to the exterior surface of the upper shaft segment, having at least one groove substantially parallel to an axial direction for meshing with the rib of the interior surface of the lower shaft segment and a first tab that fits within the first aperture of the upper shaft segment; and
   d. a second ring, circumferentially coupled to the exterior surface of the upper shaft segment, having at least one groove for meshing with the rib of the interior surface of the lower shaft segment and a second tab that fits within the second aperture.

2. The control shaft of claim 1 wherein a circumferential width of the first aperture is greater than a circumferential width of the second aperture.

3. The control shaft of claim 2, wherein the first aperture is closer to the user interface than the second aperture.

4. The control shaft of claim 2, wherein a width of the first aperture unfilled by the first tab is greater than a width of the second aperture unfilled by the second tab.

5. The control shaft of claim 3, wherein the first and the second ring are made of a plastic.

* * * * *